United States Patent
Jung (10) Patent No.: US 9,921,367 B2
(45) Date of Patent: Mar. 20, 2018

(54) DISPLAY DEVICE AND BACKLIGHT ASSEMBLY THEREOF

(71) Applicant: NEW OPTICS, LTD., Yangju-si, Gyeonggi-do (KR)

(72) Inventor: Won Joon Jung, Yangju-si (KR)

(73) Assignee: NEW OPTICS, LTD., Yangju-si, Gyeonggi-do (KR)

( * ) Notice: Subject to any disclaimer, the term of this patent is extended or adjusted under 35 U.S.C. 154(b) by 0 days.

(21) Appl. No.: 14/907,760

(22) PCT Filed: Jan. 21, 2016

(86) PCT No.: PCT/KR2016/000682
§ 371 (c)(1),
(2) Date: Apr. 11, 2016

(87) PCT Pub. No.: WO2016/117954
PCT Pub. Date: Jul. 28, 2016

(65) Prior Publication Data
US 2016/0252669 A1    Sep. 1, 2016

(30) Foreign Application Priority Data
Jan. 21, 2015   (KR) .................. 10-2015-0009993

(51) Int. Cl.
*F21V 8/00*   (2006.01)
*G02F 1/1333*   (2006.01)
*G02F 1/1335*   (2006.01)

(52) U.S. Cl.
CPC ........... *G02B 6/009* (2013.01); *G02B 6/0068* (2013.01); *G02F 1/133308* (2013.01);
(Continued)

(58) Field of Classification Search
CPC .... G02B 6/009; G02B 6/0068; G02B 6/0051; G02F 1/133308; G02F 2001/133314;
(Continued)

(56) References Cited

U.S. PATENT DOCUMENTS

| 4,875,140 A * | 10/1989 | Delpech | H05K 7/142 174/138 D |
| 2006/0176416 A1 * | 8/2006 | Ikeda | G02F 1/133308 349/58 |

(Continued)

*Primary Examiner* — Anthony Haughton
*Assistant Examiner* — Yahya Ahmad
(74) *Attorney, Agent, or Firm* — Novick, Kim & Lee, PLLC; Jae Youn Kim (57) ABSTRACT

The present invention relates to a display device and a backlight assembly thereof. The backlight assembly according to an aspect of the present invention includes: a circuit board on which a circuitry member for controlling the display device is mounted; a cover bottom which covers the rear surface of the display device, in which an insertion hole corresponding to the circuit board is punched on the bottom thereof, and in which the circuit board is installed to be accommodated in the interior of the insertion hole; a first coupling part coupled to the circuit board; and a second coupling part coupled to the cover bottom. The backlight assembly comprises a bracket that fixes the circuit board to the cover bottom.

10 Claims, 9 Drawing Sheets

(52) U.S. Cl.
CPC ............... *G02B 6/0051* (2013.01); *G02F 2001/133314* (2013.01); *G02F 2001/133612* (2013.01)

(58) Field of Classification Search
CPC ... G02F 2001/133612; G02F 1/133314; G02F 1/133317
USPC ..................... 361/759; 362/97.1; 349/58
See application file for complete search history.

(56) References Cited

U.S. PATENT DOCUMENTS

| | | | |
|---|---|---|---|
| 2009/0147171 A1* | 6/2009 | Yang | G02F 1/133308 349/58 |
| 2011/0109844 A1* | 5/2011 | Go | G02F 1/133308 349/65 |
| 2011/0317415 A1* | 12/2011 | Yamanaka | H05K 5/0017 362/235 |
| 2012/0176761 A1* | 7/2012 | Lee | G02F 1/133308 361/807 |
| 2014/0273632 A1* | 9/2014 | Kim | H01Q 1/12 439/620.01 |
| 2015/0098247 A1* | 4/2015 | Shin | G02B 6/0073 362/611 |

\* cited by examiner

DISPLAY DEVICE AND BACKLIGHT ASSEMBLY THEREOF

TECHNICAL FIELD

The present invention relates to a display device and a backlight assembly thereof, and more particularly to a display device configured in an ultra-slim structure and a backlight assembly thereof.

BACKGROUND ART

Recently, the demand for design elements has been gradually increased in the field of flat panel displays (FPDs). In particular, since display articles have been utilized as interior decoration items, display articles having external appearance like picture frames have been launched in the market. In order to realize the frame-shaped displays, studies and researches have recently been performed on narrow bezel and ultra-thin housing structures.

Because a member such as a substrate is accommodated between a case top and a cover bottom in a display device according to the related art, the interval between the case top and the cover bottom increases, and accordingly, the thickness of the display product becomes larger.

DISCLOSURE

Technical Problem

An object of the present invention is to provide a display device configured in an ultra-slim structure and a backlight assembly thereof.

Objects of the present invention may not be limited to the above, and other objects will be clearly understandable to those having ordinary skill in the art from the disclosures provided below together with accompanying drawings.

Technical Solution

According to an aspect of the present invention, there is provided a backlight assembly used for a display device, the backlight assembly including: a circuit board on which a circuitry member for controlling the display device is mounted; a cover bottom which covers the rear surface of the display device, in which an insertion hole corresponding to the circuit board is punched on the bottom thereof, and in which the circuit board is installed to be accommodated in the interior of the insertion hole; a first coupling part coupled to the circuit board; and a second coupling part coupled to the cover bottom, wherein the backlight assembly includes a bracket that fixes the circuit board to the cover bottom.

According to another aspect of the present invention, there is provided a display device including the backlight assembly.

Technical solutions of the present invention may not be limited to the above, and other technical solutions of the present invention will be clearly understandable to those having ordinary skill in the art from the disclosures provided below together with accompanying drawings.

Advantageous Effects

According to the present invention, the display device can be ultra-slim.

Effects of the present invention may not be limited to the above, and other effects of the present invention will be clearly understandable to those having ordinary skill in the art from the disclosures provided below together with accompanying drawings.

BEST MODE

Mode for Invention

Embodiments described in this specification are made to clearly explain the scope of the invention to those having ordinary skill in the art, and do not intend to limit the present invention. It should be interpreted that the present invention may include substitutions and modifications within the technical scope of the present invention.

The terms used in this specification are selected from general terms, which are widely used currently, based on functions of components according to the embodiment of the present invention, and may have meanings varying according to the intentions of those skilled in the art, the custom in the field of art or advent of new technology. If a specific term is used with a specific meaning, the meaning of the term will be described specifically. Accordingly, the terms used in this specification should not be defined as simple names of the components, but be defined based on the actual meaning of the terms and the whole context throughout the present specification.

The accompanying drawings are to facilitate the explanation of the present invention and the shape in the drawings may be exaggerated for the purpose of convenience of explanation, so the present invention should not be limited to the drawings.

In addition, the details of the generally known function and structure, which make the subject matter of the present invention unclear, will be omitted.

According to an aspect of the present invention, there is provided a backlight assembly used for a display device, the backlight assembly including: a circuit board on which a circuitry member for controlling the display device is mounted; a cover bottom which covers the rear surface of the display device, in which an insertion hole corresponding to the circuit board is punched on the bottom thereof, and in which the circuit board is installed to be accommodated in the interior of the insertion hole; a first coupling part coupled to the circuit board; and a second coupling part coupled to the cover bottom, wherein the backlight assembly includes a bracket that fixes the circuit board to the cover bottom.

The circuit board may be inserted into the insertion hole such that the front surface and the rear surface thereof are situated between the front surface and the rear surface of the bottom.

The front surface of the circuit board may be situated on the rear side of the front surface of the bottom, and the rear surface of the circuit board may be situated on the same plane as the rear surface of the bottom.

The circuitry member may be mounted on the front surface of the circuit board.

The bracket may be configured such that the first coupling part and the second coupling part have a step.

The step between the first coupling part and the second coupling part may correspond to a difference of the thickness of the bottom and the circuit board.

The first coupling part and the circuit board and the second coupling part and the bottom may be screw-coupled to each other.

The screw-coupling directions of the first coupling part and the circuit board, and the second coupling part and the bottom may be opposite to each other.

The first coupling part and the circuit board may be screw-coupled to each other from the inside of the cover bottom outwards, and the second coupling part and the bottom may be screw-coupled to each other from the outside of the cover bottom inwards.

A protrusion into which a screw is inserted to be coupled may be formed on the front surface of the first coupling part, and the height of the protrusion may be smaller than the thickness of the circuitry member.

The thickness of the cover bottom at a portion where the circuit board is installed may be determined by the larger one of the total thickness of the circuit board and the circuitry member and the thickness of the cover bottom.

According to another aspect of the present invention, there is provided a display device including the backlight assembly.

Hereinafter, the display device 2000 according to an embodiment of the present invention will be described. Here, the display device 2000 should be inclusively construed as the concept including all of various display devices 2000 that outputs an image, such as an LCD display device, a PDP display device, and an OLED display device. For the purpose of convenience of explanation, the LCD curved display device will be described as an example of the display device 2000.

Figure 1:
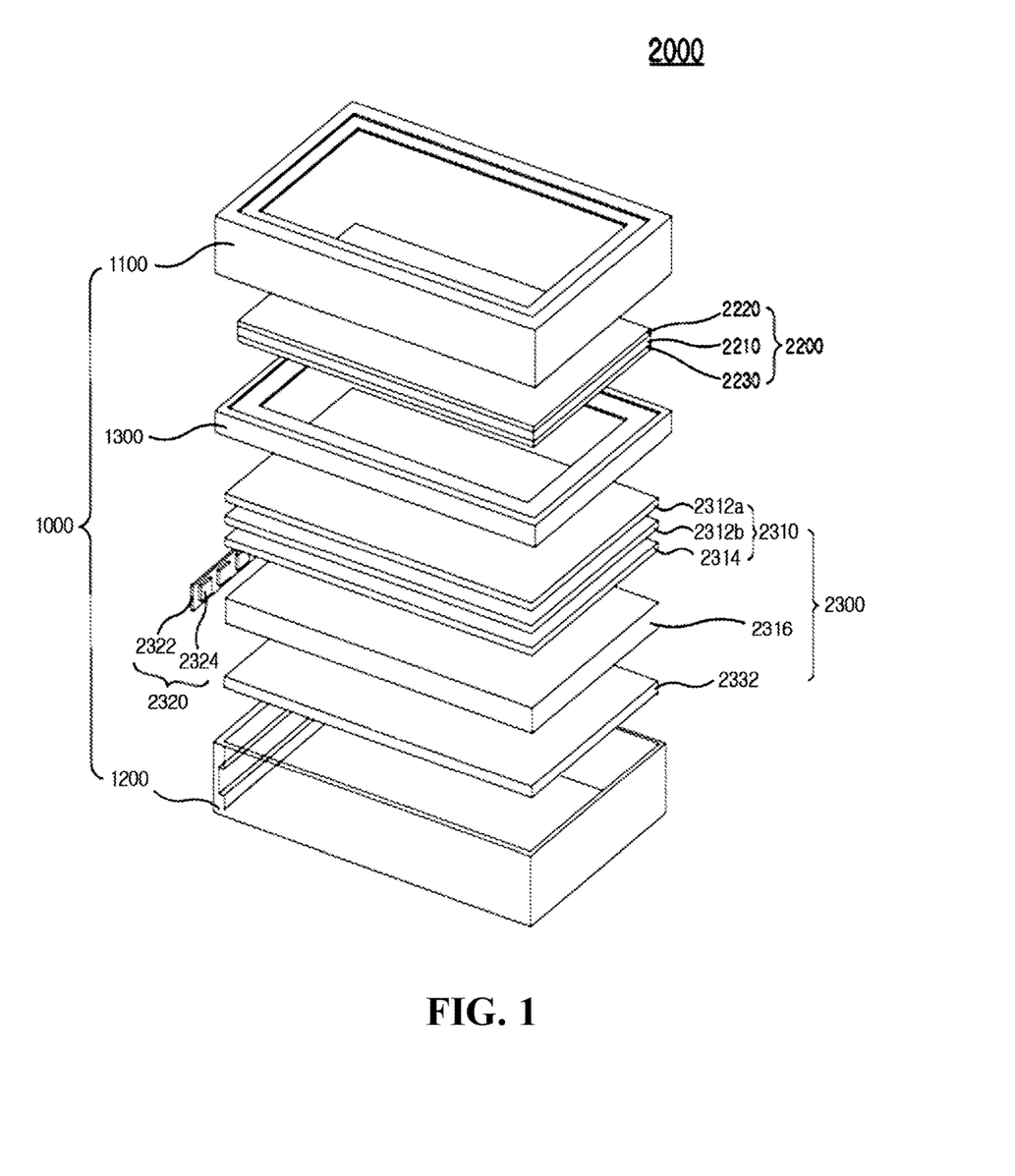
FIG. 1 is an exploded perspective view of a display device according to an embodiment of the present invention.
Figure 2:
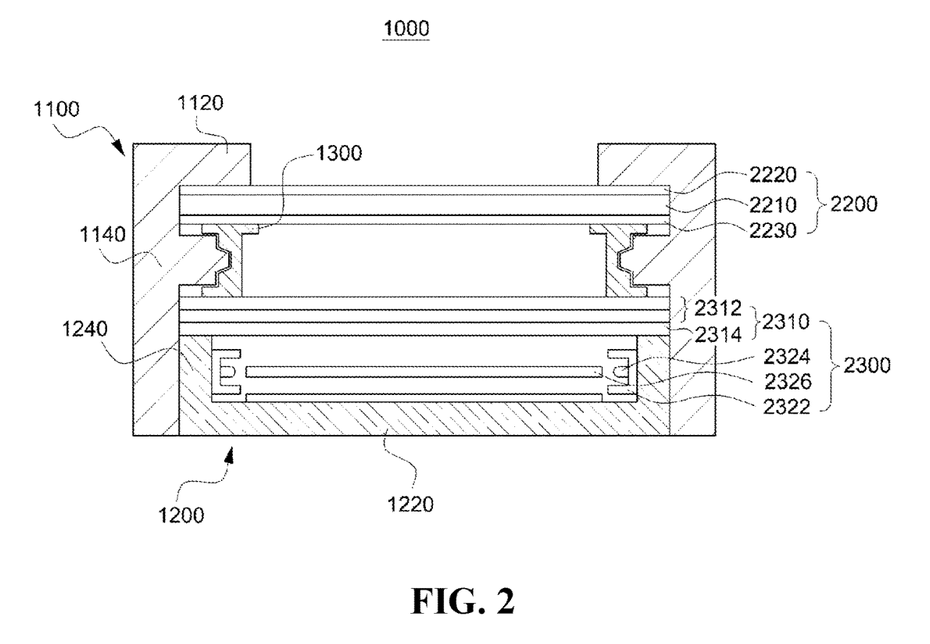
FIG. 2 is a sectional view of the display device according to the embodiment of the present invention.

FIG. 1 is an exploded perspective view of a display device 2000 according to an embodiment of the present invention, and FIG. 2 is a sectional view of the display device 2000 according to the embodiment of the present invention.

Referring to FIGS. 1 and 2, the display device 2000 may include a housing 1000, a display panel 2200, and a backlight unit 2300.

The housing 1000 accommodates the display panel 2200 and the backlight unit 2300 in the interior thereof to protect them from an external impact. Further, the housing 1000 has a function of matching the display panel 2200 and the backlight unit 2300.

The housing 1000 may include a case top 1100, a guide frame 1300, and a cover bottom 1200. The case top 1100 and the cover bottom 1200 are coupled to each other to cover the front surface and the rear surface of the display device 2000, respectively, and the guide frame 1300 is mounted between the case top 1100 and the cover bottom 1200. The guide frame 1300 may fix the display panel 2200 together with a bezel 1120 of the case top 1100, and may fix a light guide plate 2310 and an optical sheet 2316 together with the cover bottom 1200.

The display panel 2200 displays an image by using the light supplied from the backlight unit 2300.

The display panel 2200 may include two transparent substrates and a liquid crystal layer 2210 interposed between the two transparent substrates. Here, the two transparent substrates may include a color filter substrate 2230 and a thin film transistor (TFT) substrate 2220. If an electrical signal is applied to the liquid crystal layer 2210 through a gate line and a data line of the thin film transistor 2220, the alignment of the liquid crystals is changed such that the light output from the backlight unit 2300 is selectively transmitted in units of pixels, and the transmitted light is colored by the color filter 2230 to output a color image. Here, the thin film transistor substrate 2220 is electrically connected to a panel driving unit (not illustrated) such as a chip on film (COF) or a tape carrier package (TCP) through a printed circuit board (PCB) to receive a control signal.

The light guide plate 2316 may be disposed to face the rear side of the display panel 2200 in an edge type backlight unit 2300. The light guide plate 2316 functions to guide light output from a light source 2324 to a lateral side towards the display panel 2200. Patterns may be formed on top and bottom surfaces of the light guide plate 2316 and a side surface of the light guide plate 2316 adjacent to the light source 2324, respectively, to improve brightness and hot spot phenomenon. The light guide plate 2316 may be formed of poly methyl methacrylate (PMMA), MS, or MMA. The light guide plate 2316 will be described in more detail below. Meanwhile, a direct-illumination type backlight unit 2300 may include a diffusion plate that diffuses light, instead of the light guide plate 2316 that guides light.

The backlight unit 2300 may supply light to the rear side of the display panel 2200 so that the display panel 2200 outputs an image.

The backlight unit 2300 may include a light source array 2320 and a light guide plate 2316.

The light guide array 2320 may include a light source 2324 that generates light and a light source substrate 2322 on which the light source 2324 is installed. The light source 2324 may include a cold cathode fluorescent lamp (CCFL), an external electrode fluorescent lamp (EEFL), or a light emitting diode (LED). In the case of an edge type backlight unit 2300, the light source array 2320 may be installed at a peripheral portion of the display device 2000 such that the light source 2324 faces a lateral side so that light is input to an incident surface of the light guide plate 2316. The light source substrate 2322 may be installed in the cover bottom 1200, or the light source 2324 may be directly installed in the cover bottom 1200 while the light source substrate 2322 is omitted.

The optical sheet 2310 is disposed on the rear side of the display panel 2200 to face the display panel 2200, and, when the light guide plate 2316 is present, may be disposed between the display panel 2200 and the light guide plate 2316. An example of the optical sheet 2310 may be a diffusion sheet 2314 or a prism sheet 2312. The diffusion sheet 2314 uniformly diffuses light output from the light guide plate 2316 or the diffusion plate to improve the uniformity of the light output distribution and alleviate or eliminate a dark/bright pattern such as a Moire phenomenon or a hot spot. The prism sheet 2312 may adjust the path of the light to a direction perpendicular to the display panel 2200. The light that passed through the light guide plate 2316 or the diffusion sheet 2314 is disposed in all directions, and the prism sheet 2312 may output the diffused light in a direction perpendicular to the display panel 2200 to improve the luminance and angle of view of the display device 2000. According to an example, as illustrated in FIGS. 1 and 2, the optical sheet 2310 may be configured such that a vertical prism sheet 2312, a horizontal prism sheet 2312, and the diffusion sheet 2314 are sequentially disposed from a side close to the display panel 2200. The arrangement sequence of the optical sheets 2310 is not necessarily limited to the above-mentioned example. In other words, some of the optical sheets 2310 may be omitted, several sheets may be disposed (for example, two or more diffusion sheets 2314 may be disposed), or the sequence may be suitably changed according to occasions.

A reflective sheet 2322 may be attached to the cover bottom 1200. The reflective sheet 2332 may reflect the light output from the light source 2324, which proceeds to the rear side, towards the display panel 2200. The reflective sheet 2332 may reflect the light, which is output through the light guide plate 2316 or the rear surface of the diffusion plate, towards the display panel 2200 to reduce optical loss, thereby improving display luminance.

Hereinafter, the housing 1000 according to the embodiment of the present invention will be described.

Figure 3:
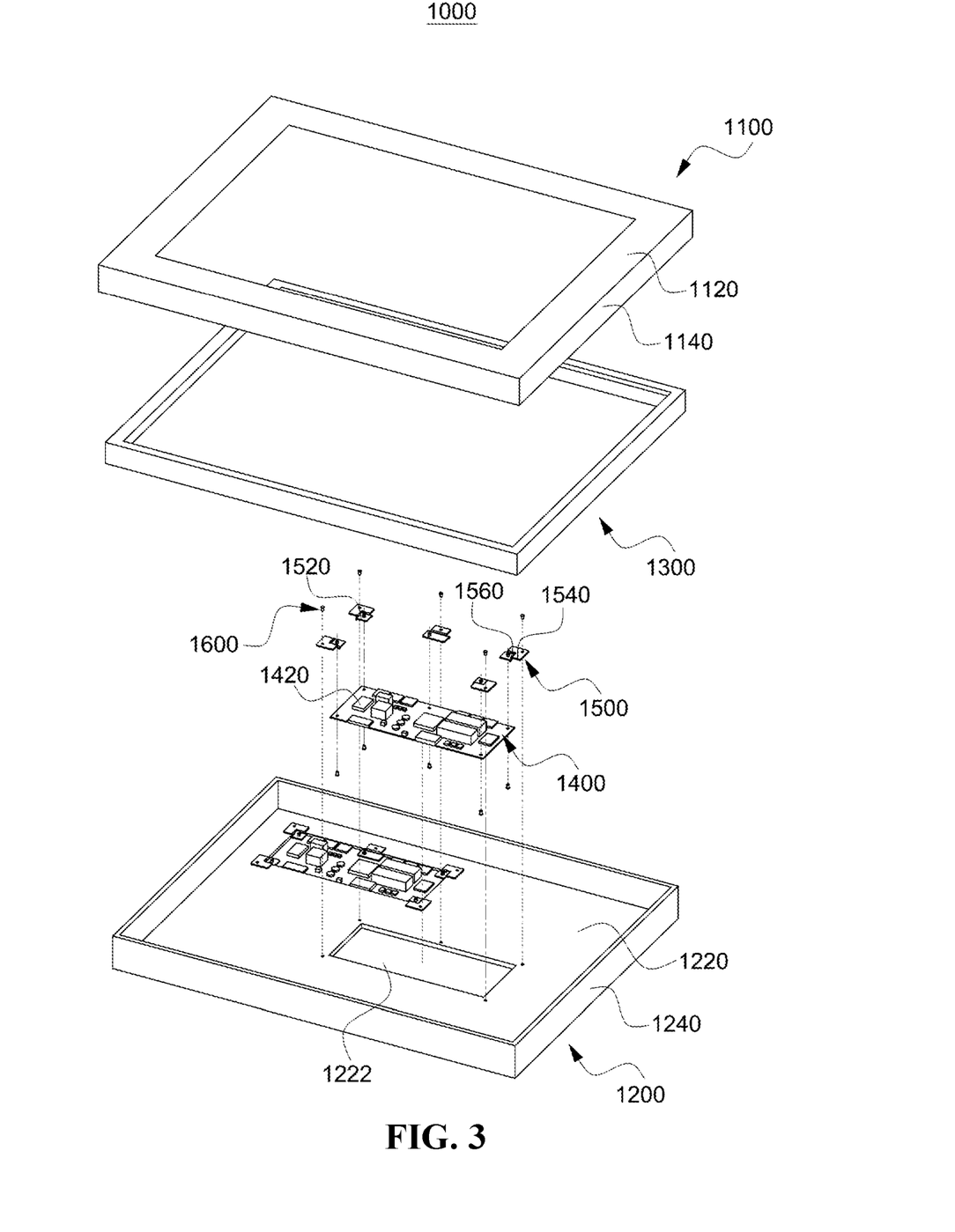
FIG. 3 is an exploded perspective view of a housing according to the embodiment of the present invention.
Figure 4:
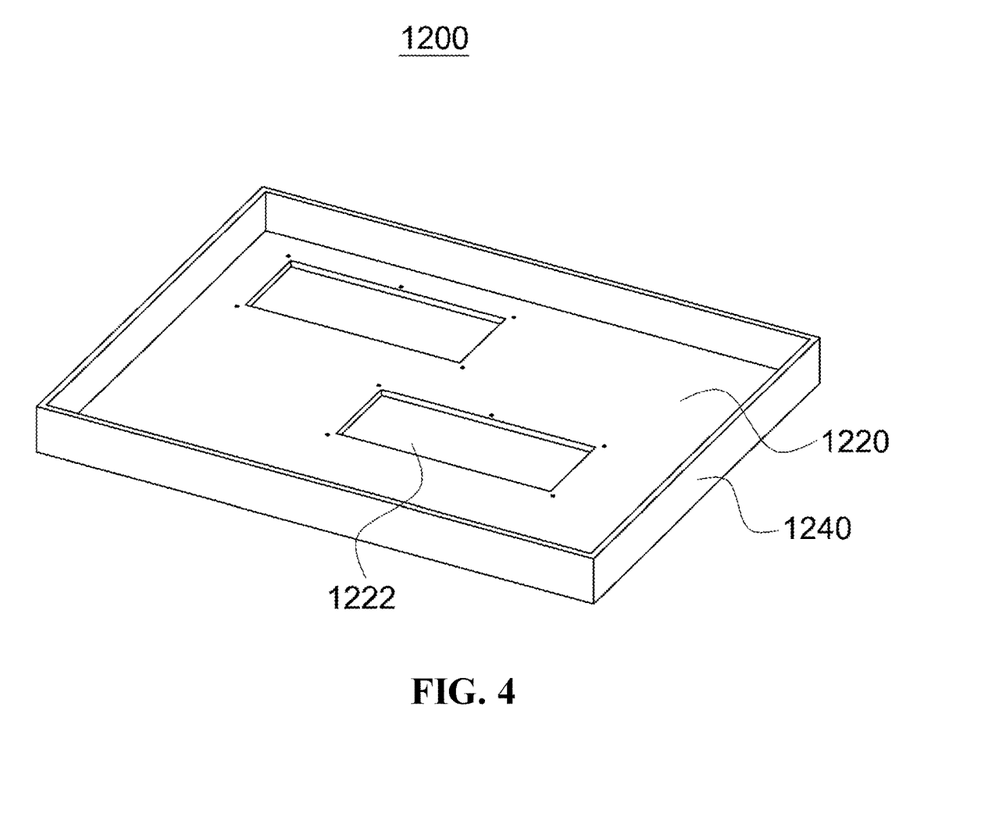
FIG. 4 is a perspective view of a cover bottom according to the embodiment of the present invention.

FIG. 3 is an exploded perspective view of a housing 1000 according to the embodiment of the present invention, and FIG. 4 is a perspective view of a cover bottom 1200 according to the embodiment of the present invention.

Referring to FIG. 3, the housing 1000 may include a case top 1100, a cover bottom 1200, and a bracket 1500.

The case top 1100 may include a bezel 1120 and an outer wall 1140.

The bezel 1120 may cover a front periphery of the display panel 2200.

The width of the bezel 1120 may vary according to the form of the display device 2000, and a narrow bezel type display device 2000 may have a bezel 1120 with a narrow width. According to occasions, the case top 1100 may rarely have the bezel 1120 or have no bezel.

The outer wall 1140 may cover a side surface of the display device 2000.

The outer wall 1140 may be curved from the outside of the bezel 1120 to extend rearwards. The outer wall 1140 may cover a side surface of the display device 2000.

Referring to FIG. 4, the cover bottom 1200 may cover the rear surface of the display device 2000, and may accommodate the circuit board 1400.

The cover bottom 1200 may include a bottom 1220 and an inner wall 1240, and may have a box shape in which a surface of the cover bottom 1200 that faces the bottom 1220 is opened.

The bottom 1220 may be provided in the form of a plate that faces the rear surface of the display panel 2200, and corresponds to the bottom of the box shape. An insertion hole 1222 having the size and form corresponding to those of the circuit board 1400 may be punched in the bottom 1220, and the circuit board 1400 may be inserted into the insertion hole 1222. Then, a circuitry member 1420 for controlling the display device 2000 may be mounted on the circuit board 1400.

The inner wall 1240 may be curved from the outside to the front side of the bottom 1220. The inner wall 1240 may be inserted into the outer wall 1140 of the case top 1100 such that the case top 1100 and the cover bottom 1200 are coupled to each other.

Hereinafter, the bracket 1500 according to the embodiment of the present invention will be described.

Figure 5:
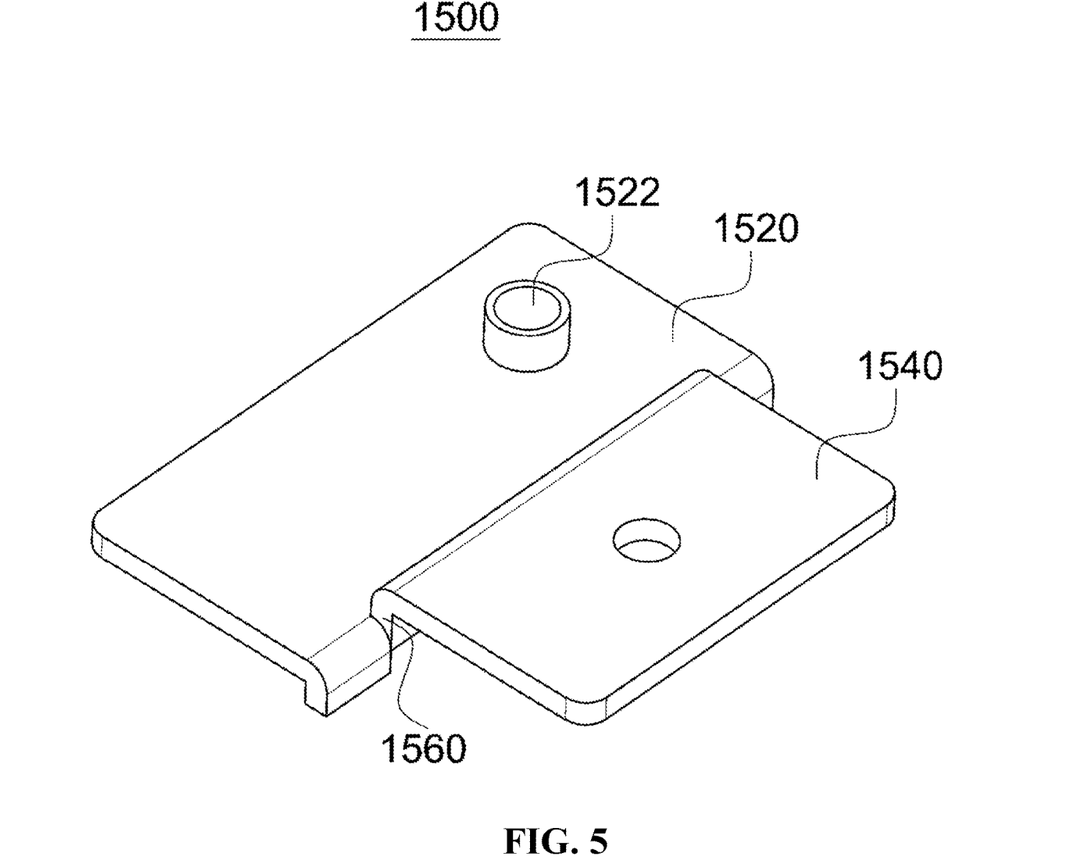
FIG. 5 is a perspective view of a first example of a bracket according to the embodiment of the present invention.

FIG. 5 is a perspective view of a first example of a bracket according to the embodiment of the present invention.

Referring to FIG. 5, the bracket 1500 functions to couple the circuit board 1400 to the cover bottom 1200, and may include a first coupling part 1520, a second coupling part 1540, and a connecting part 1560.

The first coupling part 1520 has a thin plate shape, and may be coupled to the circuit board 1400 by a coupling member 1600. The thickness of the first coupling part 1520 may be changed according to the thickness of the circuit board 1400 and the depth of the insertion hole 1222, and the total thickness of the circuit board 1400 and the first coupling part 1520 may be smaller than the depth of the insertion hole 1222. Of course, it may be possible that the total thickness of the circuit board 1400 and the first coupling part 1520 is larger than the depth of the insertion hole 1222.

The second coupling part 1540 may have a thin plate shape, and the form of the second coupling part 1540 may be determined according to the location of the bracket 1500. The second coupling part 1540 may be coupled to the front surface of the bottom 1220 of the cover bottom 1200 by the coupling member 1600. Then, it is preferable that the second coupling part 1540 is made thin in a range by which the weight of the circuit board 1400 may be supported.

The connecting part 1560 connects the first coupling part 1520 and the second coupling part 1540, and may correspond to a side surface of the insertion hole 1222. That is, the connecting part 1560 may has a thin plate shape that connects the first coupling part 1520 and the second coupling part 1540, and a portion of the connecting part 1560 that connects the first coupling part 1520 and the second coupling part 1540 may be curved.

Figure 6:
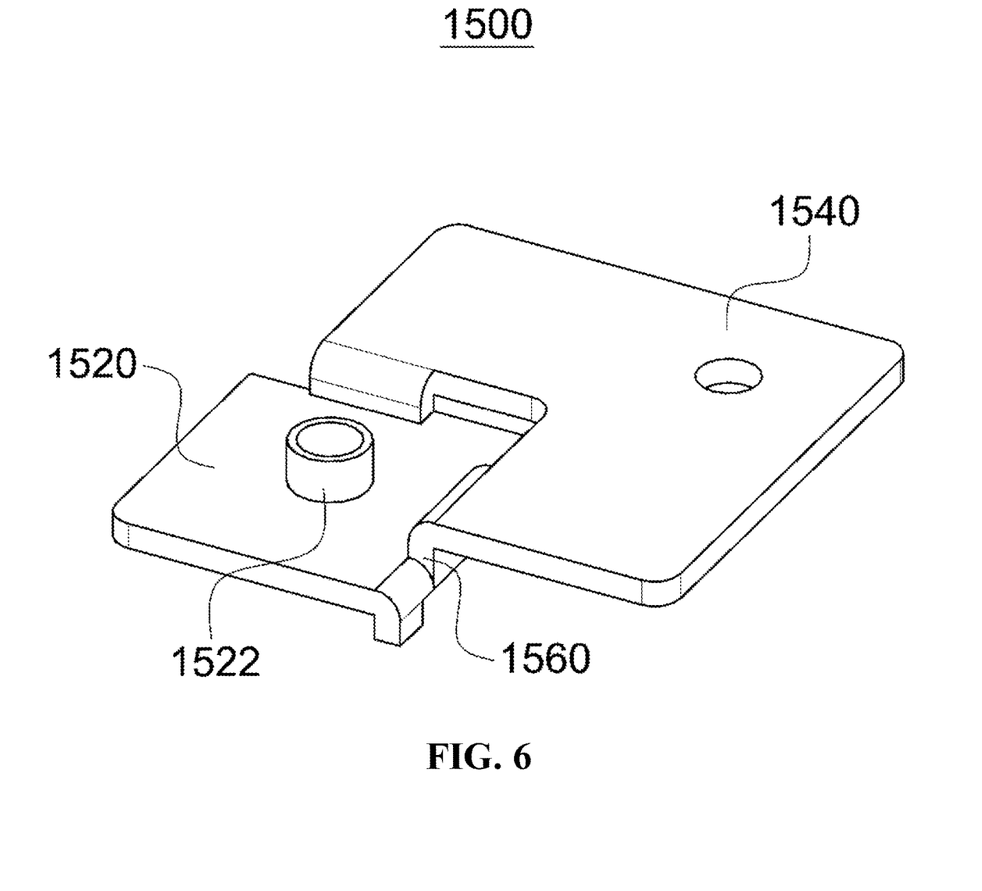
FIG. 6 is a perspective view of a second example of the bracket according to the embodiment of the present invention.

FIG. 6 is a perspective view of a second example of the bracket 1500 according to the embodiment of the present invention.

Referring to FIG. 6, the bracket 1500 functions to couple the circuit board 1400 to the cover bottom 1200, and may include a first coupling part 1520, a second coupling part 1540, and a connecting part 1560.

The bracket 1500 of the second example has the same elements as those of the bracket 1500 of the first example, and the elements are the same as those of the bracket 1500 of the first example and will not be described.

The bracket 1500 of the second example is a bracket 1500 mounted to a corner of the rectangular insertion hole 1222, in which the first coupling part 1520 has a square shape and the second coupling part 1540 has a square shape having no corner corresponding to the corner of the insertion hole 1222. The connecting part 1560 may have thin plate shapes that are perpendicular to each other.

Hereinafter, assembly of the circuit board 1400 and the cover bottom 1200 according to the embodiment of the present invention will be described.

Figure 7:
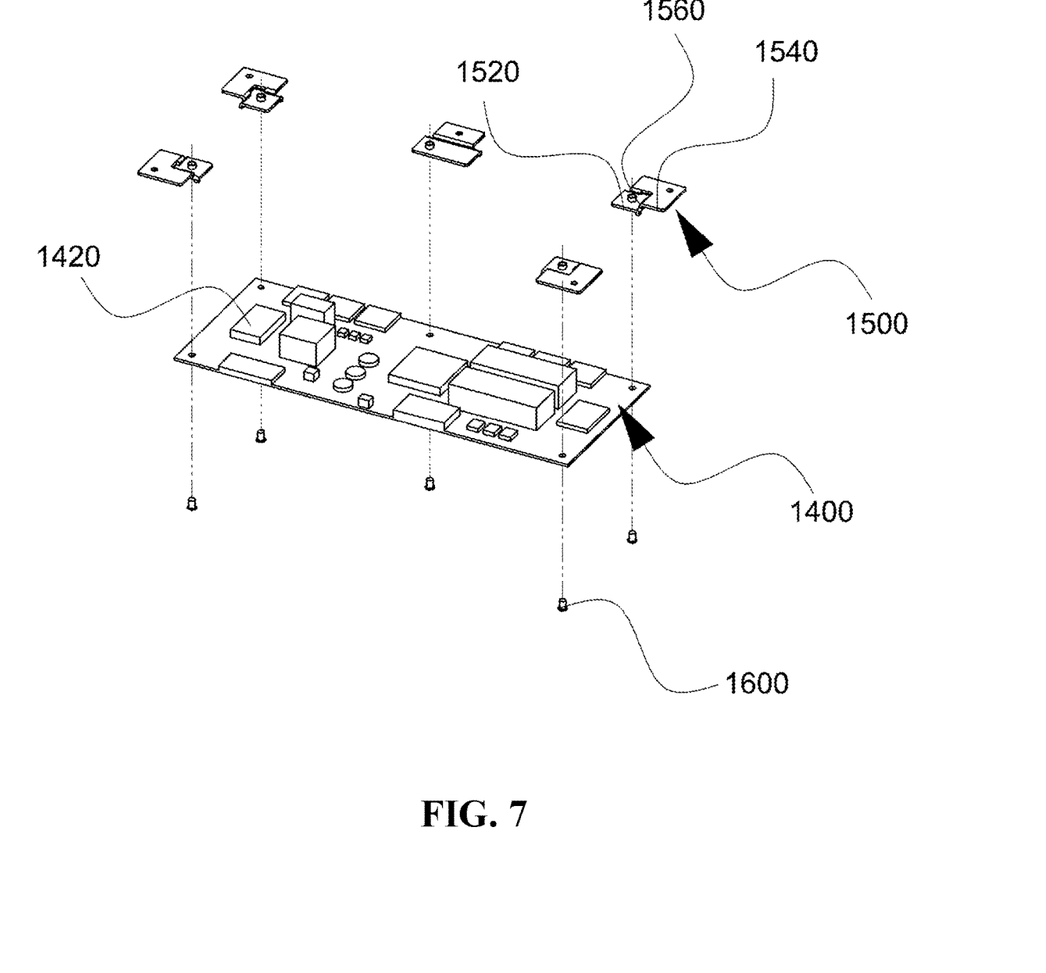
FIG. 7 is a view illustrating a process of coupling the bracket 1500 to a circuit board 1400 according to the embodiment of the present invention.
Figure 8:
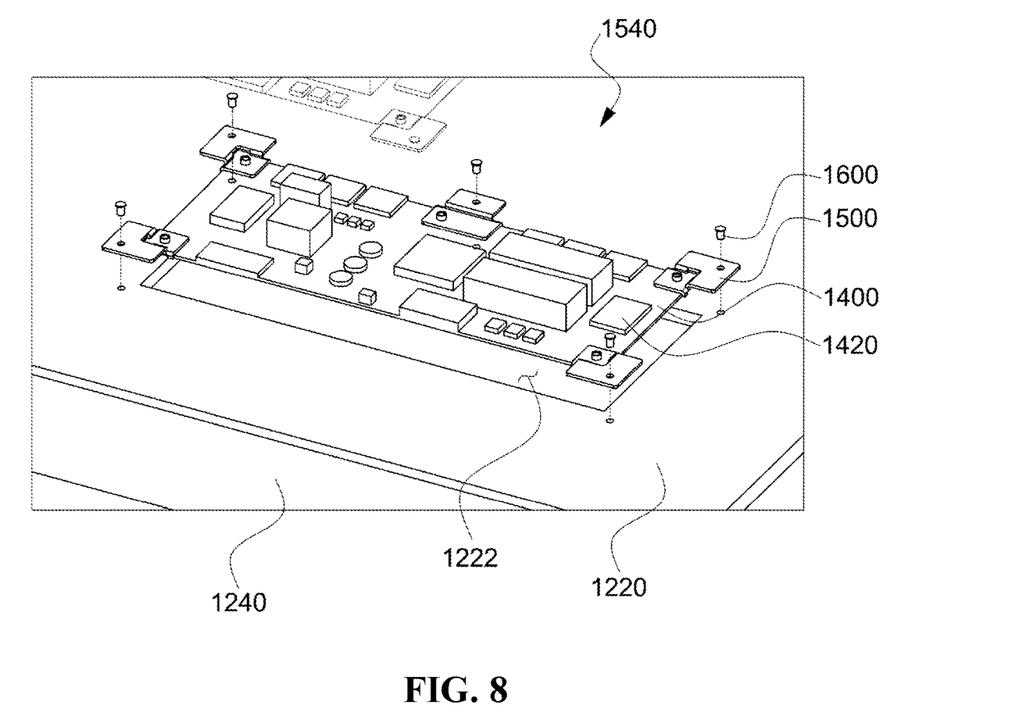
FIG. 8 is a sectional view illustrating a process of coupling the circuit board to the cover bottom according to the embodiment of the present invention.
Figure 9:
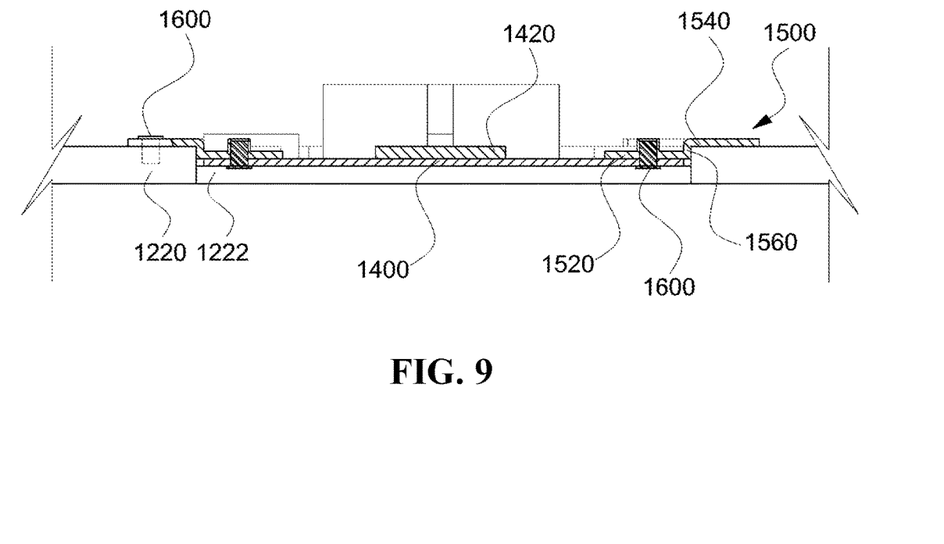
FIG. 9 is a view illustrating a coupled portion of the cover bottom on which the circuit board is mounted according to the embodiment of the present invention.

FIG. 7 is a view illustrating a process of coupling the bracket 1500 to a circuit board 1400 according to the embodiment of the present invention, FIG. 8 is a sectional view illustrating a process of coupling the circuit board 1400 to the cover bottom 1200 according to the embodiment of the present invention, and FIG. 9 is a view illustrating a coupled portion of the cover bottom 1200 on which the circuit board 1400 is mounted according to the embodiment of the present invention.

Referring to FIG. 7, the bracket 1500 may be coupled to the circuit board 1400.

The first coupling part 1520 is seated on the corner of the circuit board 1400 and the coupling member 1600 may be inserted from the rear side of the circuit board 1400 to be coupled. However, it may be possible that the coupling member 1600 is inserted from the front side to the rear side of the circuit board 1400.

Then, a protrusion 1522 that has a screw thread to be coupled to the coupling member 1600 may be formed on the front surface of the first coupling part 1520, and the height of the protrusion 1522 may be smaller than the height of the circuitry member 1420.

Referring to FIG. 8, the circuit board 1400 coupled to the first coupling part 1520 of the bracket 1500 may be inserted into and fixed to the insertion hole 1222.

If the circuit board 1400 is inserted into the insertion hole 1222, the second coupling part 1540 may be positioned on the upper surface of the bottom 1220. Then, the second coupling part 1540 may corresponding to the bottom 1220 adjacent to the corner of the insertion hole 1222.

After the second coupling part 1540 is adhered to the bottom 1220, the cover bottom 1200 and the circuit board 1400 may be fixed by inserting coupling members 1600 from the upper surface of the second coupling part 1540.

Referring to FIG. 9, the circuit board 1400 may be inserted into the insertion hole 1222 and then be fixed to the cover bottom 1200 by the bracket 1500.

The rear surface of the circuit board 1400 may be situated on the same plane as the rear surface of the cover bottom 1200, and the front surface of the circuit board 1400 may be situated on the front side of the front surface of the cover bottom 1200.

Then, the cover bottom 1200 in which the circuit board 1400 is assembled may be configured such that the coupling directions of the coupling members 1600 in which the coupling members 1600 are coupled to the first coupling part 1520 and the second coupling part 1540 may be opposite.

For example, the first coupling part 1520 may be coupled to the circuit board 1400 by the coupling member 1600 inserted from the front surface of the first coupling part 1520, and the second coupling part 1540 may be coupled to the bottom 1220 by the coupling member 1600 inserted from the rear surface of the second coupling part 1540. However, the coupling directions may be changed reversely.

When the coupling directions of the coupling members 1600 are opposite to each other, a coupling force applied to the circuit board 1400 may be increased by the coupling members 1600 so that the circuit board 1400 may be mounted to the bottom 1220 more firmly. Of course, the coupling members 1600 may be coupled in the same direction. Then, the coupling members 1600 maybe provided with screws, and the bracket 1500, the circuit board 1400, and the cover bottom 1200 may be screw-coupled to each other.

The number of the brackets 1500 may be determined according to the size of the circuit board 1400, and the number of the brackets 1500 may increase as the circuit board 1400 becomes larger. Further, the entire shape of the bracket 1500 may be changed according to the coupling location of the bracket 1500, and may have different shapes when it is provided for the circuit board 1400 and the edge of the insertion hole 1222, and is provided for the corners of the circuit board 1400 and the corner of the insertion hole 1222.

Hereinafter, the housing 1000 according to the embodiment of the present invention and the housing 1000 according to the related art will be compared.

Figure 10:
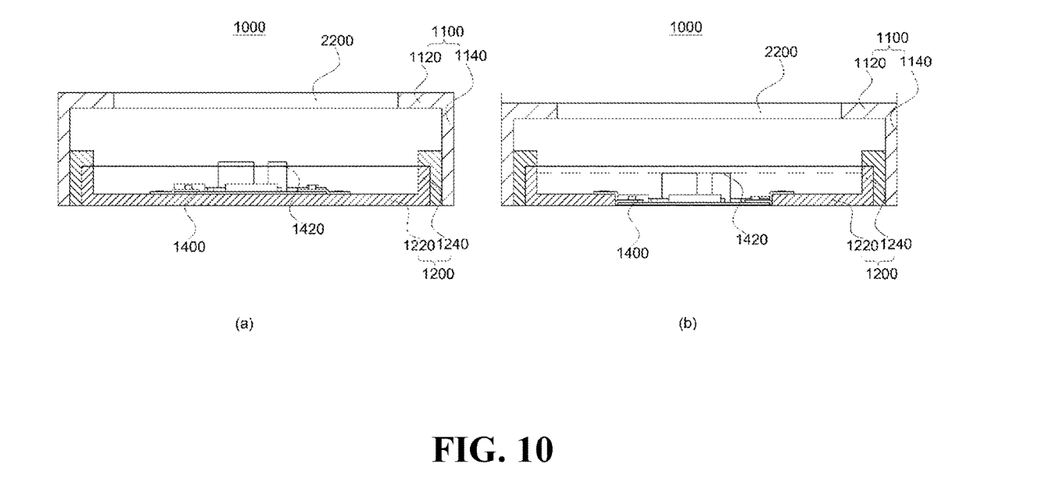
FIG. 10 is a view for comparing the cover bottom according to the embodiment of the present invention and a housing according to the related art.

FIG. 10 is a view for comparing the housing 1000 according to the embodiment of the present invention and a housing 1000 according to the related art.

Referring to FIG. 10, the thickness of the housing 1000 according to the present invention is smaller than the thickness of the housing 1000 according to the related art.

The thickness difference of the two housings 1000 may be changed according to the difference of the heights by which the circuit board 1400 protrudes from the front surface of the bottom 1220.

In the housing 1000 according to the present invention, the circuit board 1400 may be inserted into and fixed to the insertion hole 1222 punched in the bottom 1220. Then, the thickness of the cover bottom 1200 at a portion where the circuit board 1400 is installed may be determined by the one which has the larger thickness of the total thickness of the circuit board 1400 and the circuitry member 1420 and the thickness of the cover bottom 1200. Accordingly, the heights of the circuit board 1400 protruding from the front surface of the bottom 1220 and the circuitry member 1420 provided for the circuit board 1400 may be reduced by the depth by which the circuit board 1400 is inserted into the insertion hole 1222. In this way, if the heights of the circuit board 1400 protruding from the front surface of the bottom 1220 and the circuitry member 1420 provided for the circuit board 1400 are minimized, an interval between the case top 1100 and the cover bottom 1200 can be minimized. Accordingly, the final thickness of the housing 1000 may become thinner.

The above description is to simply illustrate the technical scope of the present invention and various modifications and substitutions can be made by those skilled in the art without departing from the scope of the present invention. Therefore, the embodiments of the present invention described above may be implemented independently or in combination with each other.

Therefore, the embodiments disclosed in the present invention do not intend to limit the technical scope of the present invention, but to explain the present invention, and the technical scope of the present invention will not be limited by the embodiments, but shall be interpreted as defined in the claims. All technical scopes within the scope of the claims should be interpreted to be included within the scope of the present invention.

The invention claimed is:

1. A backlight assembly used for a display device, the backlight assembly comprising:
    a circuit board on which a circuitry member for controlling the display device is mounted;
    a cover bottom which covers a rear surface of the display device, in which an insertion hole corresponding to the circuit board is punched on a bottom thereof, and in which the circuit board is installed to be accommodated in an interior of the insertion hole; and
    a bracket that fixes the circuit board to the cover bottom, wherein the bracket includes a first coupling part coupled to the circuit board and a second coupling part coupled to the cover bottom,
    wherein the bracket is configured such that the first coupling part and the second coupling part have a step, and wherein the step is disposed between the first coupling part and the second coupling part and corresponds to a difference of a thickness of the bottom of the cover bottom and a thickness of the circuit board.

2. The backlight assembly of claim 1, wherein the circuit board is inserted into the insertion hole such that a front surface and a rear surface thereof are situated between a front surface and a rear surface of the bottom of the cover bottom.

3. The backlight assembly of claim 1, wherein a front surface of the circuit board is situated on a rear side of a front surface of the bottom of the cover bottom, and a rear surface of the circuit board is situated on a same plane as a rear surface of the bottom of the cover bottom.

4. The backlight assembly of claim 1, wherein the circuitry member is mounted on a front surface of the circuit board.

5. The backlight assembly of claim 1, wherein the first coupling part and the circuit board and the second coupling part and the bottom of the cover bottom are screw-coupled to each other.

6. The backlight assembly of claim 5, wherein screw-coupling directions of the first coupling part and the circuit board, and the second coupling part and the bottom of the cover bottom are opposite to each other.

7. The backlight assembly of claim 5, wherein the first coupling part and the circuit board are screw-coupled to each other from an inside of the cover bottom outwards, and the second coupling part and the bottom of the cover bottom are screw-coupled to each other from an outside of the cover bottom inwards.

8. The backlight assembly of claim 5, wherein a protrusion into which a screw is inserted to be coupled is formed on a front surface of the first coupling part, and a height of the protrusion is smaller than a thickness of the circuitry member.

9. A display device comprising the backlight assembly as claimed in claim 1.

10. A backlight assembly used for a display device, the backlight assembly comprising:
   a circuit board on which a circuitry member for controlling the display device is mounted;
   a cover bottom which covers a rear surface of the display device, in which an insertion hole corresponding to the circuit board is punched on a bottom thereof, and in which the circuit board is installed to be accommodated in an interior of the insertion hole; and
   a bracket that fixes the circuit board to the cover bottom,
   wherein the bracket includes a first coupling part coupled to the circuit board and a second coupling part coupled to the cover bottom,
   wherein a thickness of the cover bottom at a portion where the circuit board is installed is determined by a larger one of a total thickness of the circuit board and the circuitry member and a thickness of the cover bottom.

* * * * *